United States Patent [19]

Korenberg

[11] Patent Number: 4,535,707
[45] Date of Patent: * Aug. 20, 1985

[54] HIGH TURNDOWN RATIO FLUIDIZED BED REACTOR AND METHOD OF OPERATING THE REACTOR

[75] Inventor: Jakob Korenberg, York, Pa.

[73] Assignee: York-Shipley, Inc., York, Pa.

[*] Notice: The portion of the term of this patent subsequent to Jul. 27, 1999 has been disclaimed.

[21] Appl. No.: 370,918

[22] Filed: Apr. 22, 1982

Related U.S. Application Data

[63] Continuation of Ser. No. 233,507, Feb. 11, 1981, Pat. No. 4,341,515.

[51] Int. Cl.³ ................................................. F22B 1/02
[52] U.S. Cl. ........................................ 110/245; 432/58
[58] Field of Search ............... 110/245, 347; 432/15, 432/58; 34/57 A

[56] References Cited

U.S. PATENT DOCUMENTS

| | | | |
|---|---|---|---|
| 3,319,586 | 5/1967 | Albertson et al. | 110/245 |
| 3,772,998 | 11/1973 | Menigat | 110/245 |
| 3,863,577 | 2/1975 | Steever et al. | 110/245 |
| 3,897,739 | 8/1975 | Goldbach | 110/245 |
| 3,907,674 | 9/1975 | Roberts et al. | 110/245 |
| 4,075,953 | 2/1978 | Sowards | 110/245 |
| 4,231,303 | 11/1980 | Fujiu et al. | 110/245 |
| 4,241,672 | 12/1980 | Tuttle | 110/245 |
| 4,270,468 | 6/1981 | Robinson et al. | 110/245 |

Primary Examiner—Henry C. Yuen
Attorney, Agent, or Firm—Finnegan, Henderson, Farabow, Garrett & Dunner

[57] ABSTRACT

A method of operating an adiabatic fluidized bed reactor, and an adiabatic fluidized bed reactor, including the step of providing pressurized air to an adiabatic fluidized bed reactor both through openings located in a support surface and through openings located in the reactor walls having outlets below the surface of the bed of granular material. The structure of the adiabatic fluidized bed reactor includes support surface air distribution nozzles extending through a support surface, reactor wall air distribution openings extending through the reactor walls having outlets below the surface of the bed of granular material, and separate control valves for controlling the flow of pressurized air to the support surface air distribution nozzles and to the reactor wall air distribution openings. The method and apparatus of the present invention result in higher reactor hydrodynamic turndown ratios than can be achieved with conventional single-bed reactors. For example, a hydrodynamic turndown ratio of 6.6 to 1 can be achieved by the use of the method and apparatus of the present invention.

9 Claims, 1 Drawing Figure

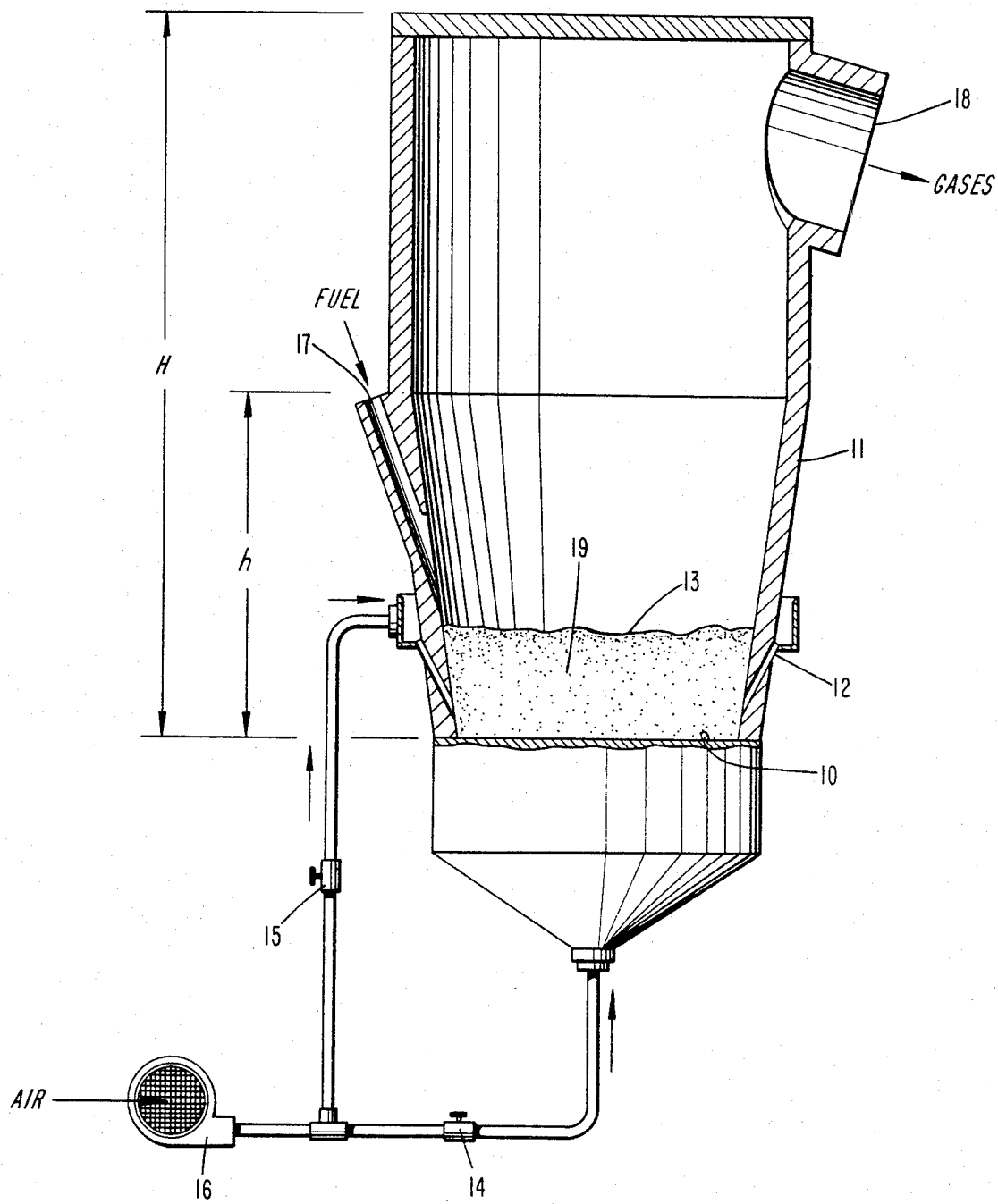

HIGH TURNDOWN RATIO FLUIDIZED BED REACTOR AND METHOD OF OPERATING THE REACTOR

This is a continuation of application Ser. No. 233,507, filed Feb. 11, 1981, now U.S. Pat. No. 4,341,515.

BACKGROUND OF THE INVENTION

The present invention is directed to an adiabatic fluidized bed reactor for combusting non-uniform particulate matter and, more specifically, to an adiabatic fluidized bed reactor in which pressurized air is supplied into a bed of granular material through openings in a support surface for the bed and through openings in the reactor walls, and to a method of operating an adiabatic fluidized bed reactor.

In fluidized bed reactors for combusting particulate material, the material to be combusted is fed over a bed of granular material, usually sand. In such reactors, it is desirable to be able to vary the amount of particulate material fed to the reactor and, concomitantly, the amount of pressurized air supplied to the reactor over as wide a range as possible. The hydrodynamic turndown ratio of a reactor, which is defined as the ratio of pressurized air flow at maximum reactor load to pressurized air flow at minimum reactor load, is a measure of the ability of a reactor to operate over the extremes of its load ranges.

In conventional fluidized bed reactors, pressurized air is fed to the reactor bed through air distribution nozzles located in a grate that supports the bed of granular material. An example of such a conventional fluidized bed is disclosed in U.S. Pat. No. 4,075,953 to Sowards, specifically in the embodiment depicted in FIG. 1 of that patent, and in U.S. Pat. No. 3,907,674 to Roberts et al. At conventional bed heights, the minimum pressure drop across the air distribution nozzles needed to maintain proper fluidization at minimum reactor load ranges from 2 to 4 inches of water. The former figure relates to medium height beds while the latter refers to deep fluidized beds. At maximum reactor load, pressure drops exceeding 8 to 12 inches of water are not economically practical inasmuch as excessive forced draft fan horsepower would be required. Since the pressure drop across the air distribution nozzles is directly proportional to the square of the volumetric air flow rate, it can be seen that the hydrodynamic turndown ratio in such conventional reactors is limited to 2 to 1.

In order to obtain hydrodynamic turndown ratios in excess of 2 to 1, the prior art reverted to the use of fluidized beds with multiple compartments, i.e., fluidized beds with multiple beds. Two conventional beds give a 4 to 1 turndown ratio and three beds give a 6 to 1 turndown ratio. A significant disadvantage of such multiple-bed reactors is that a cold, shut down bed requires time to be brought back in line. Moreover, although multiple compartments can be used for square or rectangular-shaped fluidized beds, the difficulties encountered when using multiple compartments with cylindrical-shaped reactors outweigh the advantages. Thus, as can be seen from the above discussion, notwithstanding the need for a fluidized bed reactor with turndown ratios in excess of 2 to 1, the prior art has not satisfactorily provided a solution.

In the previously discussed conventional fluidized bed combustors, fluidizing air is supplied to the bed only from air distribution nozzles located in the bed support. In the past, air has also been supplied through the reactor walls of a fluidized bed reactor for the purpose of pneumatically feeding particulate material into the bed, such as disclosed in U.S. Pat. No. 3,897,739 to Goldbach. Additionally, air has been supplied through the reactor walls of a fluidized bed combustor above the surface of the bed for the purpose of effecting mixing and complete combustion, such as disclosed in U.S. Pat. No. 3,863,577 to Steever et al. Finally, in non-adiabatic fluidized bed combustors that utilize internal cooling surfaces and that do not use a bed of granular material when solid carbonaceous particulate material is burned, air has been supplied through the reactor walls of the combustor for the purpose or promoting combustion, such as disclosed in U.S. Pat. No. 4,165,717 to Reh et al. As can be seen, the prior art has not supplied pressurized air through the reactor walls of an adiabatic fluidized bed reactor for the purpose of increasing the turndown ratio of the reactor, nor has the prior art provided a method or structure for obtaining hydrodynamic turndown ratios in excess of 2 to 1 when the fluidized bed reactor utilizes a single bed of granular material.

SUMMARY OF THE INVENTION

The present invention has solved the problem of obtaining hydrodynamic turndown ratios in excess of 2 to 1 in single bed, adiabatic fluidized bed reactors by supplying pressurized air to the reactor through both the bed support and reactor walls as more fully described hereinbelow.

In accordance with the present invention a method of operating an adiabatic fluidized bed reactor that utilizes a bed of granular material for combusting non-uniform particulate matter is disclosed comprising providing an adiabatic fluidized bed reactor having reactor walls terminating in a support surface that supports a bed of granular material, feeding non-uniform particulate matter to the reactor, and supplying pressurized air to the reactor in excess of the stoichiometric amount needed for combustion both through openings located in the support surface and through openings located in the reactor walls having outlets below the surface of the bed of granular material.

Preferably, the flow of pressurized air to the reactor is adjusted by adjusting the flow of pressurized air to the reactor wall openings independently of adjusting the flow of pressurized air to the support surface openings. The flow of pressurized air is most preferably adjusted by reducing the flow of pressurized air to the reactor wall openings, and reducing the flow of pressurized air to the support surface openings only after the flow of pressurized air to the reactor wall openings has been reduced to zero.

It is preferred that the bed of granular material have a particle size distribution that will allow adequate fluidization at minimum reactor air flow rate, and that will prevent blow out at maximum reactor air flow rate. Additionally, it is preferred that at maximum operating capacity for the reactor, up to 70% of the pressurized air supplied to the reactor is supplied by the reactor wall openings and 30% or more is supplied by the support surface openings. Most preferably, 50% to 70%, and particularly 60 to 70%, of the pressurized air is supplied by the reactor wall openings, and 30% to 50%, and particularly 30% to 40%, of the pressurized air is supplied by the support surface openings. Preferably, the flow of pressurized air to the support surface openings is reduced by no more than 50% of the flow through those openings at maximum operating capacity. The reactor wall openings preferably direct pressurized air downwardly toward the support surface.

The present invention is also directed to an adiabatic fluidized bed reactor comprising reactor walls forming an adiabatic reactor bed, support surface for supporting a bed of granular material, support surface air distribution means extending through the support surface, reactor wall air distribution means extending through the reactor walls having outlets below the surface of the bed of granular material, means to supply pressurized air to the support surface air distribution means and the reactor wall air distribution means, first air control means for controlling the flow of pressurized air to the support surface air distribution means, and second air control means, independent from the first air control means, for controlling the flow of pressurized air to the reactor wall air distribution means.

Preferably, the walls of the fluidized bed reactor are downwardly converging, and the reactor wall air distribution means directs pressurized air downwardly toward the support surface.

By use of the present invention, hydrodynamic turndown ratios in excess of 2 to 1 can be obtained without the necessity of having to use multiple bed reactors, thus avoiding the problems associated with having to shut down portions of the reactor bed. For example, a hydrodynamic turndown ratio of 6.6 to 1 can be obtained when, at maximum operating capacity, 70% of the pressurized air supplied to the reactor is supplied by the reactor wall openings and 30% is supplied by the support surface openings, and a hydrodynamic turndown ratio of 5 to 1 can be obtained when, at maximum operating capacity, 60% of the pressurized air supplied to the reactor is supplied by the reactor wall openings and 40% is supplied by the support surface openings. Additionally, the introduction of pressurized air through the reactor wall openings, as disclosed herein, advantageously results in more vigorous fluidization, thereby preventing slag formation that is inherent in many existing fluidized bed combustors.

BRIEF DESCRIPTION OF THE DRAWING

The sole drawing is a diagrammatic vertical section view of a fluidized bed reactor in accordance with the present invention.

DESCRIPTION OF THE PREFERRED EMBODIMENTS

In order to more specifically define the present invention reference will be made to the accompanying drawing, which is incorporated in and constitutes a part of this specification, that illustrates a preferred embodiment of the present invention.

The present invention has specific application to adiabatic fluidized bed reactors. As used therein and in the accompanying claims, "adiabatic fluidized bed reactor" means a fluidized bed reactor that does not contain internal cooling means. The temperature of such a reactor is controlled by the use of pressurized air in substantial excess of the stochiometric amount needed for combustion.

Referring to the accompanying drawing, an adiabatic fluidized bed reactor is disclosed having reactor walls 11 terminating in a support surface 10 for supporting a bed of granular material 19. The material to be combusted is introduced into the reactor through inlet 17, and exhaust gases are removed through outlet 18. The material to be combusted can be non-uniform particulate matter, such as wood waste, municipal refuse, carbonaceous material, etc.

The support surface 10 includes support surface air distribution means extending through the support surface for supplying pressurized air to the reactor. The support surface air distribution means can be openings with nozzles extending therefrom, as is well-known. Any type of support surface 10 can be used in the present invention. For example, a flat plate with air distribution nozzles can be used, such as disclosed in U.S. Pat. No. 4,075,953, supra, specifically in the embodiment depicted in FIG. 1 of that patent, and in U.S. Pat. No. 3,907,674, supra. Preferably, the support surface should include both support surface air distribution means and means for removing tramp and/or agglomerated material from the reactor bed. Examples of such preferred support surfaces that can be used in the present invention are disclosed in copending U.S. patent application Ser. No. 213,318 to Jakob Korenberg entitled FLUIDIZED BED REACTOR UTILIZING A CONICAL-SHAPED SUPPORT AND METHOD OF OPERATING THE REACTOR, filed on Dec. 5, 1980, now U.S. Pat. No. 4,372,228, and copending U.S patent application Ser. No. 213,349, to Jakob Korenberg entitled A FLUIDIZED BED REACTOR UTILIZING A BOTTOMLESS PLATE GRID AND METHOD OF OPERATING THE REACTOR, filed on Dec. 5, 1980 now U.S. Pat. No. 4,382,415. Both of the aforementioned copending applications are incorporated herein by reference.

A critical feature of the present invention is the use of reactor wall air distribution means extending through reactor walls 11 having outlets below the surface 13 of the bed of granular material 19. The reactor wall air distribution means can be openings 12 located in reactor walls 11. Preferably, openings 12 direct pressurized air downwardly toward support surface 10.

Means are provided to supply pressurized air to both the openings in support surface 10 and the openings 12 in reactor walls 11. For example, a single blower 16 can be used to supply pressurized air to both the support surface openings and reactor wall openings, or, alternatively, one blower can be used to supply pressurized air to the support surface openings and another separate blower can be used to supply pressurized air to the reactor wall openings.

In order to vary the amount of pressurized air supplied to the reactor first air control means for controlling the flow of pressurized air to the openings in support surface 10 and second air control means, independent from the first air control means, for controlling the flow of pressurized air to openings 12 are provided. Any type of control means can be used. For example, the first air control means can be a valve 14 and the second air control means can be a valve 15. Although the amount of pressurized air supplied by the reactor wall openings, as a percentage of the total air supplied to the reactor at maximum capacity, can vary, preferably up to 70% is supplied by the reactor wall openings and, consequently, 30% or more is supplied by the support surface openings. Most preferably, 50% to 70%, and particularly 60% to 70%, is supplied by the reactor wall openings, and 30% to 50%, and particularly 30% to 40%, is supplied by the support surface openings.

As previously discussed, the support surface 10 supports a bed of granular material 19. The selection of the granular material 19 will turn on the intended use of the reactor. Preferably, when the reactor is used as a combustor, the granular material 19 is sand or other inert granular material. Since the fluidized bed reactor of the present invention will operate over a wide range of pressurized air flow rates, preferably the particle size distribution of the granular material 19 will allow adequate fluidization at minimum reactor air flow rate, and will prevent blow out at maximum reactor air flow rate. With such a particle size distribution, the largest particles will be fluidized at the minimum reactor air flow rate and the smallest particles, excluding fines, will not be carried out of the reactor at the maximum reactor air flow rate.

In order to permit the use of granular material 19 having a larger range of particle sizes, particularly the use of larger size particles, it is preferred that the reactor walls 11 be downwardly converging. Preferably, the value of h (the height of the conical-shaped walls) should be 50 to 60% of the value for H (the total reactor height). By the use of downwardly converging reactor walls in the lower portion of the reactor, the air velocity in the lower portion of the reactor will be greater than the freeboard air velocity, thereby enabling larger size particles to be fluidized at the minimum air flow rate for the reactor. The reactor height above the conical-shaped section of the reactor should be sufficient to separate smaller particles that are blown out from the conical-shaped section of the reactor due to the higher air velocity in that section.

In a most preferred method in accordance with the present invention, at maximum operating capacity, valves 14 and 15 are wet such that 70% of the pressurized air supplied to the reactor is supplied by the reactor wall openings, and 30% is supplied by the support surface openings. The actual maximum pressurized air flow rate should be such that the pressure drop across the support surface openings is about 8 inches of water at maximum operating capacity. As previously discussed, this pressure drop would not require excessive forced draft fan horsepower. When it is desired to commence turning the reactor down, valve 15 should be adjusted until the desired reduction in pressurized air flow is obtained. The air flow selected will depend on the amount of fuel (non-uniform particulate matter) fed to the reactor and the reactor temperature. With respect to the latter, it must be kept in mind that one of the functions of the pressurized air in an adiabatic reactor is to control the reactor temperature. During this period of turndown, valve 14 remains untouched. Only when valve 15 has been completely closed and the air flow through the reactor wall openings has been reduced to zero is valve 14 adjusted to reduce the air flow through the support surface openings. If the air flow to the support surface openings is reduced to 50% of the flow through those openings at maximum reactor capacity, the pressure drop across the support surface openings will be 2 inches of water. As previously discussed, this value corresponds to the minimum pressure drop that is needed to maintain proper fluidization for a medium height bed. Thus, it can be readily seen that a turndown ratio of 6.6 to 1 has been achieved.

To turn the reactor up from its minimum operating capacity to its maximum operating capacity, valve 14 is opened from its partially closed position to its maximum operating capacity position, discussed supra. At this point, valve 15 is then re-opened and brought back to its maximum operating capacity position, also discussed supra.

Although the invention has been described in the context of a single-bed, fluidized bed reactor, it can also be used with multiple-bed, fluidized bed reactors in order to reduce the number of required beds to a minimum. Moreover, the invention can be used in all environments where fluidized bed reactors find utility.

It will be apparent to those of ordinary skill in the art that various modifications and variations can be made to the above-described embodiments without departing from the scope of the appended claims and their equivalents.

What is claimed is:

1. A method of operating an adiabatic fluidized bed reactor that utilizes a bed of granular material for combusting non-uniform particulate matter to obtain a hydrodynamic turndown ratio in excess of 2 to 1 comprising:

providing an adiabatic fluidized bed reactor having reactor walls terminating in a support surface that supports a bed of granular material;

feeding non-uniform particulate matter to said reactor;

supplying pressurized air to said reactor in excess of the stoichiometric amount needed for combustion both through openings located in said support surface and through openings located in said reactor walls having outlets below the surface of said bed of granular material, wherein said supplying pressurized air is independent of said feeding non-uniform particulate matter, and adjusting the distribution of pressurized air between said support surface openings and reactor wall openings to permit a hydrodynamic turndown ratio in excess of 2 to 1 to be obtained.

2. The method of operating an adiabatic fluidized bed reactor of claim 1 further comprising adjusting the flow of pressurized air to said reactor by adjusting the flow of pressurized air to said reactor wall openings independently of adjusting the flow of pressurized air to said support surface openings.

3. The method of operating the adiabatic fluidized bed reactor of claim 1 or 2 wherein said reactor walls are downwardly converging.

4. The method of operating the adiabatic fluidized bed reactor of claim 1 or 2 wherein said bed of granular material has a particle size distribution that will allow adequate fluidization at minimum reactor air flow rate, and that will prevent blow out at maximum reactor air flow rate.

5. The method of operating the adiabatic fluidized bed reactor of claim 1 or 2 wherein at maximum operating capacity for the reactor, up to 70% of the pressurized air supplied to said reactor is supplied by said reactor wall openings and 30% or more is supplied by said support surface openings.

6. The method of operating the adiabatic fluidized bed reactor of claim 5 wherein at maximum operating capacity for the reactor, 50% to 70% of the pressurized air supplied to said reactor is supplied by said reactor wall openings and 30% to 50% is supplied by said support surface openings.

7. The method of operating the adiabatic fluidized bed reactor of claim 5 wherein at maximum operating capacity for the reactor, 60% to 70% of the pressurized air supplied to said reactor is supplied by said reactor wall openings and 30% to 40% is supplied by said support surface openings.

8. The method of operating the adiabatic fluidized bed reactor of claim 1 or 2 wherein at maximum operating capacity for the reactor, up to 70% of the pressurized air supplied to said reactor is supplied by said reactor wall openings and 30% or more is supplied by said support surface openings, and the flow of pressurized air to said support surface openings is reduced by no more than 50% of the flow through those openings at maximum operating capacity.

9. The method of operating the adiabatic fluidized bed reactor of claim 1 or 2 wherein said reactor wall openings direct pressurized air downwardly toward said support surface.

* * * * *